(12) United States Patent
Gan

(10) Patent No.: US 9,057,426 B2
(45) Date of Patent: Jun. 16, 2015

(54) SWIVELING JOINT FOR A HORSE HEAD ON A PUMP JACK

(71) Applicant: OEMic, Inc., Houston, TX (US)

(72) Inventor: Jianhui Gan, Cypress, TX (US)

(73) Assignee: IBY Outlet Group LLC, Houston, TX (US)

( * ) Notice: Subject to any disclaimer, the term of this patent is extended or adjusted under 35 U.S.C. 154(b) by 177 days.

(21) Appl. No.: 13/962,247

(22) Filed: Aug. 8, 2013

(65) Prior Publication Data

US 2015/0040692 A1 Feb. 12, 2015

(51) Int. Cl.
*F04B 47/02* (2006.01)
*F16H 25/14* (2006.01)

(52) U.S. Cl.
CPC ............. *F16H 25/14* (2013.01); *F04B 47/022* (2013.01); *Y10T 74/18182* (2015.01)

(58) Field of Classification Search
CPC . Y10T 74/18182; F04B 47/02; F04B 47/022; F04B 47/04; F04B 47/028; E21B 43/127
USPC ............................................................. 74/41
See application file for complete search history.

(56) References Cited

U.S. PATENT DOCUMENTS

| 1,913,976 A | 5/1930 | Colman |
| 2,561,623 A | 9/1947 | Hall |
| 2,471,198 A | 3/1948 | Cormany |
| 2,958,237 A * | 11/1960 | Johnson .......................... 74/522 |
| 3,006,201 A | 10/1961 | Ross |
| 4,092,872 A | 6/1978 | McClure |
| 4,666,026 A | 5/1987 | Poulin |
| 4,683,764 A * | 8/1987 | Neuhauser et al. ............... 74/41 |
| 5,064,044 A | 11/1991 | Oketani |

FOREIGN PATENT DOCUMENTS

CN 101864930 6/2010

* cited by examiner

*Primary Examiner* — William Kelleher
*Assistant Examiner* — Valentin Craciun
(74) *Attorney, Agent, or Firm* — Andrew W. Chu; Craft Chu PLLC

(57) ABSTRACT

A swiveling joint system for a horse head on a pump jack includes a working beam, a worm drive, a horse head member, and at least one locking pin. The swiveling joint system improves access to parts of the well because the horse head member can be swiveled out of position instead of being completely disassembled. The locking pin holds the horse head member in alignment with the working beam. When the locking pin is removed, the worm drive controls the swiveling of the horse head member in either direction towards either side of the working beam. The worm drive has a worm gear attached to the horse head member so that movement and position of the horse head corresponds to movement of the worm gear. The horse head member and working beam are rotatable relative to each other on a pivot pin, which can be connected to a lubricator.

20 Claims, 4 Drawing Sheets

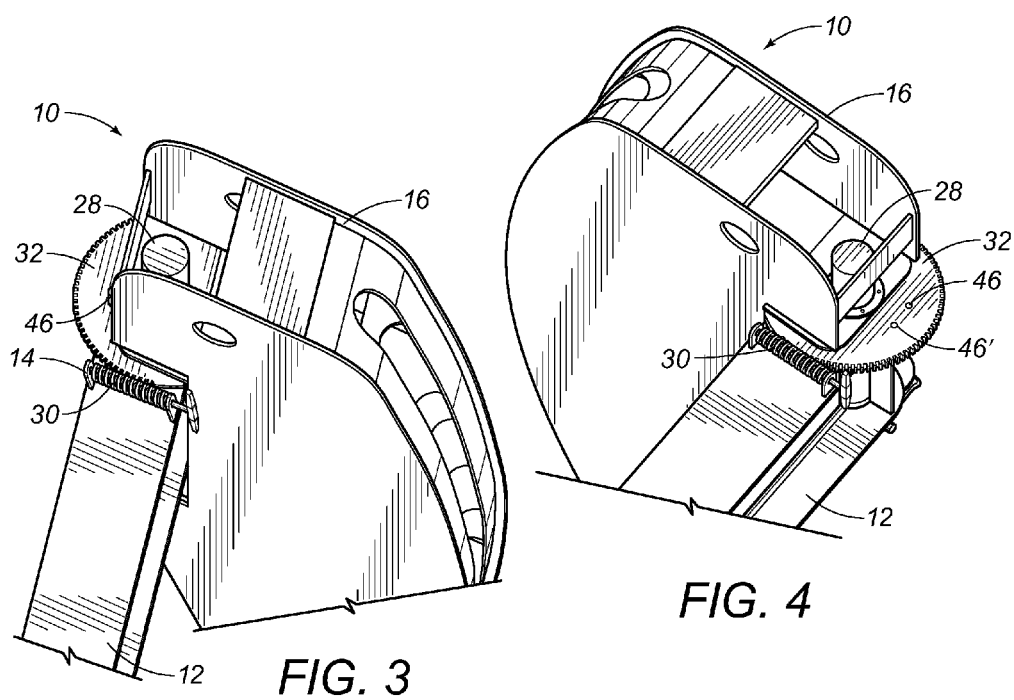
FIG. 3
FIG. 4
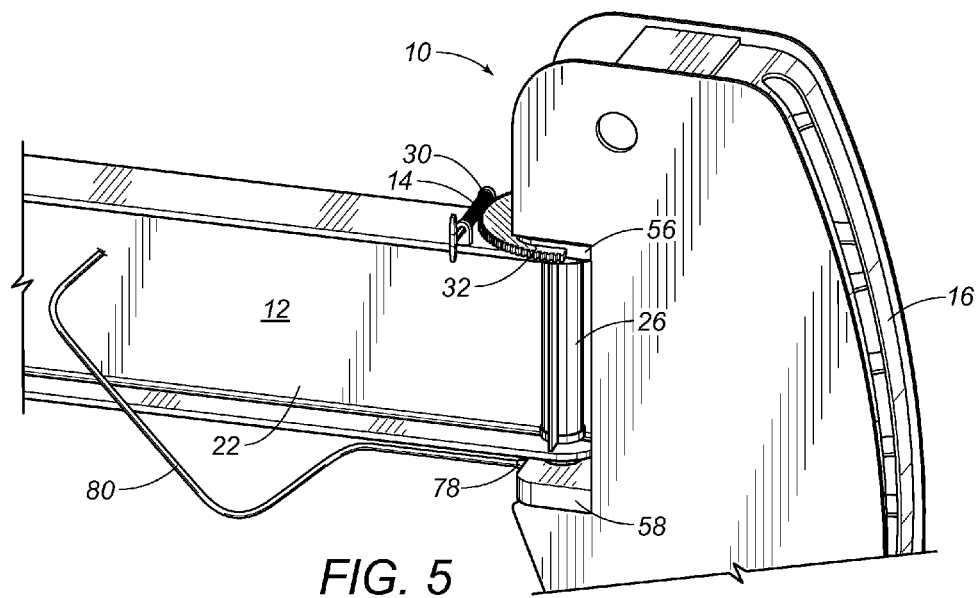
FIG. 5

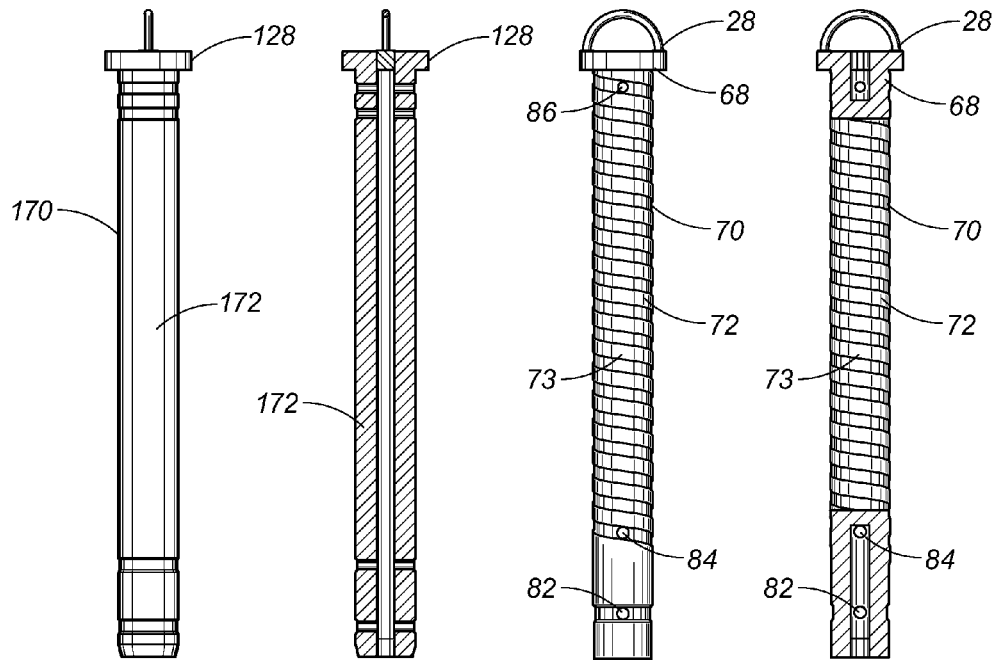
FIG. 6　FIG. 7　FIG. 8　FIG. 9
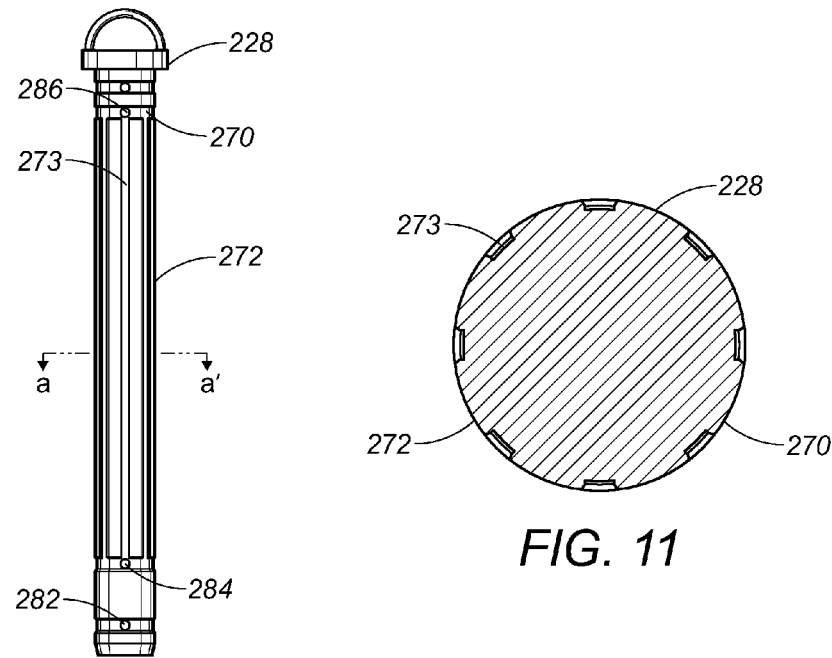
FIG. 10
FIG. 11

SWIVELING JOINT FOR A HORSE HEAD ON A PUMP JACK

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a swiveling joint for pump jack. More particularly, the present invention relates to a swiveling joint between the working beam and the horse head of a pump jack. The present invention further relates to improved access to the pump jack for maintenance, repair, and inspection of an oil or gas well.

2. Description of Related Art Including Information Disclosed Under 37 CFR 1.97 and 37 CFR 1.98

A reciprocating piston pump in an oil well mechanically lifts liquid out of the well, when the downhole pressure is not sufficient to push the liquid to reach the surface. Rotary motion of a motor is converted to the vertical piston stroke into the wellbore. The suction created by the piston action lifts the liquid from the downhole location. There are several terms used to refer to a reciprocating piston pump, due to the distinctive appearance of this equipment. Those terms include "nodding donkey", "horsehead pump", "sucker rod pump", "thirsty bird", and "rocking horse". A "pump jack" or "pumping unit" is a device to provide reciprocating movement for the downhole rod pumping action. The term, "pump jack" will be used throughout the present application.

Pump jacks are well known, and the basis of this technology has been around for at least hundreds of years, originating in steam engines for boats. Basic components of the pump jack include the motor, crank, counterweight, post arm, walking beam or working beam, a horse head, a bridle, and a rod. The motor provides rotary motion, which is translated through the crank, counterweight, post, working beam, and horse head to create reciprocating vertical movement in the bridle mounted on the horse head and attached to the rod. Access to these components of the pump jack is important for maintenance, repair, and inspection of the well. The scale of the components is significant, requiring heavy lifting and special equipment for manipulating and rearranging. For example, the horse head is bulky and heavy. Disassembly of the horse head from the working beam requires heavy lifting equipment to insure safety of workers and avoidance of damage to the horse head.

Prior art solutions to access for maintenance, repair, and inspection have also sought to avoid the disassembly of the pump jack. A swiveling joint between the horse head and the working beam, and accessories attached to the horse head are known. Chinese Patent Application No. 101864930, issued to Liu et al. on Oct. 20, 2010, discloses a device for turning the horse head of a pump jack. There is a system of plates and shafts to control the rotation, and a worm gear powers the rotation from the underside of the working beam. U.S. Pat. No. 4,092,872, issued to McClure on Jun. 6, 1978, describes the older accessories for attachment to the horse head. The patent shows a safety device attached to the horse head to protect against injuries and damage when removing the horse head for maintenance.

Prior art references also disclose general swiveling joint structures, which are not specifically aimed for a pump jack in an oil field. U.S. Pat. No. 1,913,976, issued to Colman on Jun. 13, 1933, discloses the worm gear and geared cam used to open and close a gate. The mechanical elements of the horizontally mounted worm gear and the perpendicular relationship to the rotation of the geared cam are known. U.S. Pat. No. 3,006,201, issued to Ross on Oct. 31, 1961, describes a well pump means as a pump jack. The horse head application is shown, but the swivel action by a worm gear is placed on the other end of the working beam. Also, the swivel action is not related to the horse head. The elements to utilize the action of the worm gear are located in a different place for a different function.

It is an object of the present invention to provide a swivel joint for a pump jack.

It is another object of the present invention to provide a swivel joint for a pump jack between the working beam and the horse head.

It is another object of the present invention to provide a safer pump jack for maintenance, repair, and inspection.

It is another object of the present invention to provide a pump jack with improved access for oil or gas well maintenance, repair, and inspection.

It is still another object of the present invention to provide a swivel joint for a pump jack, wherein the horse head can swivel in both directions on both sides of the working beam.

It is still another object of the present invention to provide a swivel joint with a worm drive coordinated with a position of the horse head.

It is still another object of the present invention to provide a swivel joint system with lubrication.

It is still another object of the present invention to provide a swivel joint system with a pivot pin compatible with a lubricator.

These and other objectives and advantages of the present invention will become apparent from a reading of the attached specifications and appended claims.

SUMMARY OF THE INVENTION

Embodiments of the present invention include a swiveling joint system for a pump jack. The swiveling joint system includes a working beam, a worm drive, a horse head member, and a locking pin. The swiveling joint system improves access to the parts of the pump jack for maintenance, repair, and inspection in a safe and efficient manner. Disassembly of the bridle and horse head is avoided because the horse head can be swiveled out of position instead of being removed. The locking pin holds the horse head member in alignment with the working beam. When the locking pin is removed, the worm drive coordinates the swivel action of the horse head member in either direction towards either side of the working beam.

The working beam can have a working end and a balancing end. There is a first locking hole on the working end for engaging the worm drive, and a pivot hole and a pivot pin on the working end for engaging the horse head member. The worm drive is comprised of a worm and a worm gear. The worm is comprised of worm threads, and a handle or handwheel attached to an end of the worm. The worm gear is comprised of a gear pivot hole at a center of the worm gear, a plurality of teeth on a circular edge, and a second locking hole corresponding in location to the first locking hole on the working beam. The worm gear is aligned with the middle of the horse head member and mounted on a top side of the working beam with worm threads aligned with a length of the working beam.

The horse head member of the embodiments of the present invention has a means for connecting to the working beam. The means for connecting includes a mounting notch formed within a body of the horse head member, a top mounting plate on a top shoulder of the mounting notch, and a bottom mounting plate on a bottom shoulder of the mounting notch. The mounting notch corresponds in size to the working end of the working beam so that the horse head member can freely rotate around the pivot pin on the working end of the working beam. The pivot pin extends through the top mounting plate, the gear pivot hole of the worm gear, the pivot hole of the working beam, and the bottom mounting plate of the horse head member.

Embodiments of the present invention also include the locking pin removeably inserted through the second locking hole on the worm gear and the first locking hole on the working beam. This alignment is an active configuration, when the pump jack performs work. The position of the worm gear and the structural relationship between the horse head member and the worm gear is stable and controlled. When the locking pin is removed, the body of the horse head member can swivel out of alignment with the length of the working beam. The actuation of the worm threads engages teeth along a circular edge of the worm gear in either direction away from the center of the circular edge, where the worm gear was locked. The body of the horse head member can have a range of rotation corresponding to the teeth on the worm gear. Away from center and locked alignment, the pump jack is in an inactive configuration for repair, maintenance, and inspection because the horse head member can perform no work in the well. In some embodiments, the horse head member ranges in movement from orthogonal to one side of the working beam to orthogonal to an opposite side of the working beam. The worm gear has self-locking elements so that the horse head member does not move unless actuated by the worm drive. In another embodiment, there are two locking pins with corresponding two first and second locking holes. In still another embodiment, there are side locking pins with corresponding first and second side locking holes on the working beam and on the worm gear. The side locking pins can reinforce the held position of the horse head member set by the worm gear. For example, side locking holes can be positioned to align when the horse head member is orthogonal to either side of the working beam.

In at least one embodiment, there is a lubricator providing lubricant to the pivot pin so that the pivot pin resists wear from the swiveling action of the horse head member. The lubricator may include a hose member connected to a supply of lubrication, a connection port to pivot pin through the horse head member, an inlet in fluid communication with the outer surface of the pivot pin, and an outlet on the pivot pin in fluid communication with the outer surface of the pivot pin and a storage reservoir. The lubricant is delivered to the pivot pins, and excess material is collected at the storage reservoir. The pivot pin of the present invention also has various embodiments to be compatible with the lubricator. The pivot pin can include a sealed lid, a horse head pin, a shaft with an outer surface. The outer surface can be smooth or textured with spiral grooves or longitudinal slot. Seal rings can also be used to prevent leakage of the lubricant into other parts of the pump jack.

BRIEF DESCRIPTION OF THE DRAWINGS

FIG. 3 is a perspective view of the swiveling joint of FIG. 1, showing a first alternative position of the horse head member. The swiveling joint is in an inactive configuration.

FIG. 4 is another perspective view of the swiveling joint of FIGS. 1 and 3, showing a second alternative position of the horse head member on an alternate side of the working beam.

FIG. 5 is a perspective view of a swiveling joint for a pump jack, according to another embodiment of the present invention with a lubrication means.

FIG. 6 is an isolated elevation view of one embodiment of the pivot pin according to the present invention.

FIG. 7 is an isolated longitudinal cross-sectional view of the embodiment of the pivot pin of FIG. 6.

FIG. 8 is an isolated elevation view of another embodiment of the pivot pin according to the present invention, showing spiral grooves on the shaft.

FIG. 9 is an isolated longitudinal cross-sectional view of the embodiment of the pivot pin of FIG. 8.

FIG. 10 is an isolated elevation view of still another embodiment of the pivot pin according to the present invention, showing longitudinal slots along the shaft.

FIG. 11 is an isolated horizontal cross-sectional view along line a-a' of the embodiment of the pivot pin of FIG. 10.

DETAILED DESCRIPTION OF THE DRAWINGS

Figure 1:
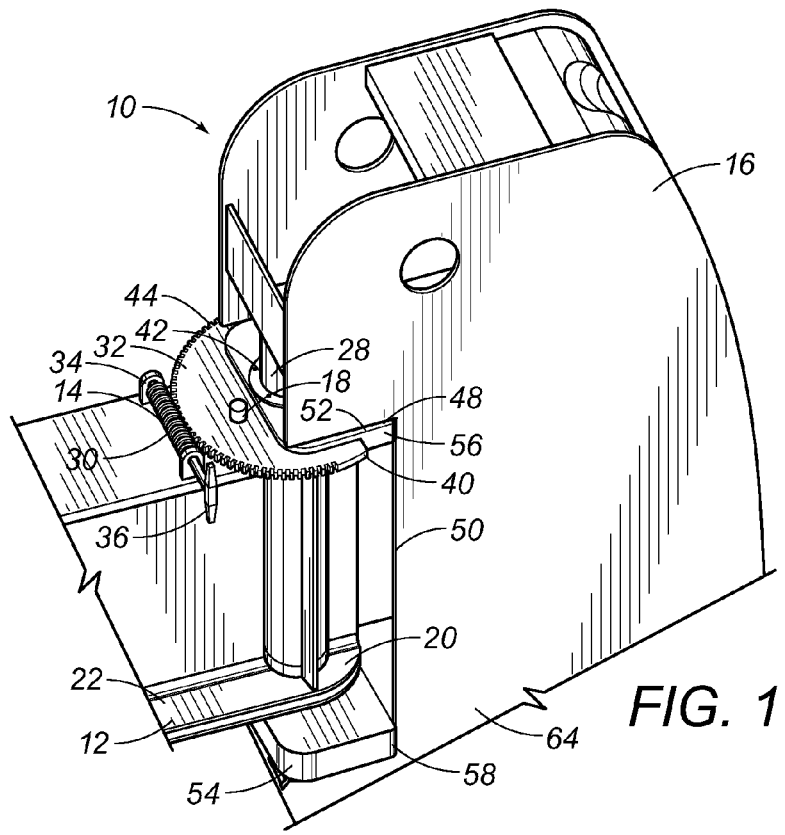
FIG. 1 is a perspective view of a swiveling joint for a pump jack according to at least one embodiment of the present invention. The swiveling joint is in an active configuration.

Referring to FIGS. 1-5 and 12, at least one embodiment of the present invention is a swiveling joint system 10 for a pump jack, including a working beam 12, a worm drive 14, a horse head member 16, and a locking pin 18. The swiveling joint system 10 allows the horse head member 16 to rotate from an active configuration (FIGS. 1 and 2) to an inactive configuration (FIG. 3 or FIG. 4). The active configuration corresponds to the pump jack working to lift oil from an oil well. The horse head member 16 is aligned with the working beam 12 in a locked state. The other components of the pump jack, including the motor, crank, bridle, and rod, can function as a system to produce from the well. The inactive configuration corresponds to the pump jack in a resting mode. The components of the pump jack, including the working beam 12 and the horse head member 16 are not producing from the well, and the components are available for maintenance, repair, and inspection. The position of the horse head member 16 relative to the working beam 12 is moveable from the locked state, so that there is easy access to the components of the well without disassembly of components of the pump jack. For example, the horse head member no longer has to be dismantled from the pump jack in order to service the well. The access is also safer for workers because the heavy components, like the horse head member 16 remains mounted and supported by the pump jack.

Figure 2:
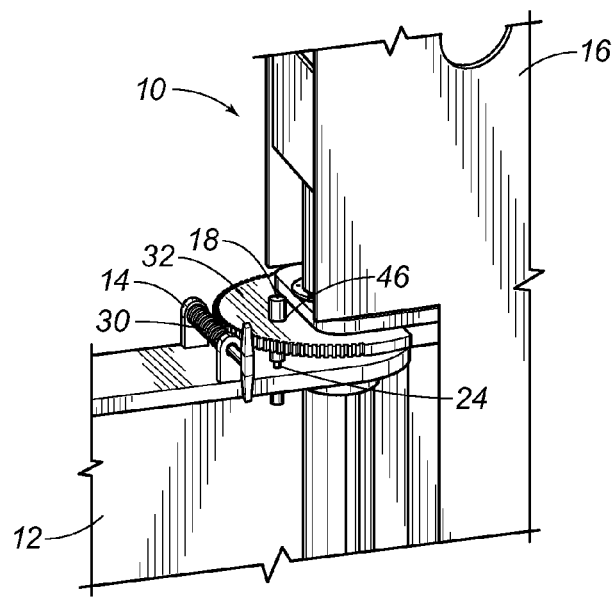
FIG. 2 is another perspective view of the swiveling joint of FIG. 1, showing the swiveling joint from a different angle, including a view of the locking pin.

FIGS. 1-5 show an embodiment of the working beam 12. The working beam 12 can include a working end 20 and a balancing end 22. The working end 20 connects to the horse head member 16 and performs the reciprocating action into the well. The balancing end 22 (not shown completely) is the opposite end of the working beam 12. The balancing end 22 engages the motor and crank to power the action of the working 20. In FIGS. 1-5, and 12, the working end 12 has a first locking hole 24, a pivot hole 26 and a pivot pin 28. The first locking hole 24 is located closer to the balancing end 22 than the pivot hole 26. The pivot hole 26 extends through the working end 20, while the first locking hole 24 may only extend through one side of the working beam 12. In other embodiments, the first locking hole 24 may extend to more than one side of the working beam 12. FIGS. 1-2 show the first locking hole 24 extending through a top side of the working beam 12.

An embodiment of the worm drive 14 is shown in FIGS. 1-5. The worm drive 14 is positioned on the working end 20. FIGS. 1-2 show the worm drive 14 on the top side of the working beam 12. The worm drive 14 is comprised of a worm 30 and a worm gear 32. The worm 30 is mounted on a top side of the working beam 12 and extends across a width of the working beam 12. In at least one embodiment, the worm 30 is oriented orthogonal to a length of the working beam 12.

The worm 30 can be comprised of worm threads 34 and a handle means 36. The worm threads 34 are oriented along a length of the working beam 12. The handle means 36 attaches to an end of the worm 34 and can rotate the worm threads 34 in either direction. The orientation of the worm 30 relative to the working beam 12 affects the orientation of the worm threads 34 relative to the working beam 12 as well. The alignment of the worm threads 34 controls swiveling movement, such that the alignment can affect the structure and interrelationship with the worm gear 32 to swivel the horse head member 16.

The worm gear 32 has a generally semicircular shape with a circular edge 38 and a flat edge 40. Embodiments of the worm gear 32 include a gear pivot hole 42 at a center of the worm gear 32, a plurality of teeth 44 on the circular edge 38, and a second locking hole 46. The gear pivot hole 42 aligns with the pivot hole 26 of the working beam 12 so that the worm gear 32 rotates on the same axis as the working beam 12. The pivot pin 28 can extend through the gear pivot hole 42 and the pivot hole 26 on the working end 20 of the working beam 12. The pivot pin 28 is the common axis of rotation. The pivot pin 28 fixes alignment and attachment of the worm gear 32 on the working end 20. The teeth 44 engage the worm threads 34 of the worm 30 fixed on the working beam 12. With the worm 30 fixed in place, rotation of the worm 30 moves the worm gear 32 by the teeth 44 on the circular edge 38. FIGS. 1, 2, and 5 also show second locking hole 46 corresponding in location to the first locking hole 24 on the working beam 12. The second locking hole 46 is radially spaced from gear pivot hole 42 towards the circular edge 38. The location of the second locking hole 46 relative to the gear pivot hole 42 corresponds to the location of the first locking hole 24 relative to the pivot hole 26. As seen in FIG. 1, the flat edge 40 faces away from the worm 30.

Embodiments of the swiveling joint system 10 of the present invention also include the horse head member 16 with a means for connecting 48 to the working beam 12. The horse head member 16 rotates relative to the working end 20 of the working beam 12, and the common axis of rotation is the pivot pin 28. The means for connecting 48 on the horse head member 16 comprise a mounting notch 50, a top mounting plate 52, and a bottom mounting plate 54. The mounting notch 50 is formed within a body 64 of the horse head member 16. The size of the mounting notch 50 corresponds to the working end 20 of the working beam 12. The working beam 12 must fit within the mounting notch 50 with sufficient clearance to rotate through the mounting notch 50 as the horse head member 16 swivels. The mounting notch 50 has a top shoulder 56 engaging the top mounting plate 52 and a bottom shoulder 58 engaging the bottom mounting plate 54, as shown in both FIGS. 1 and 5.

Figure 12:
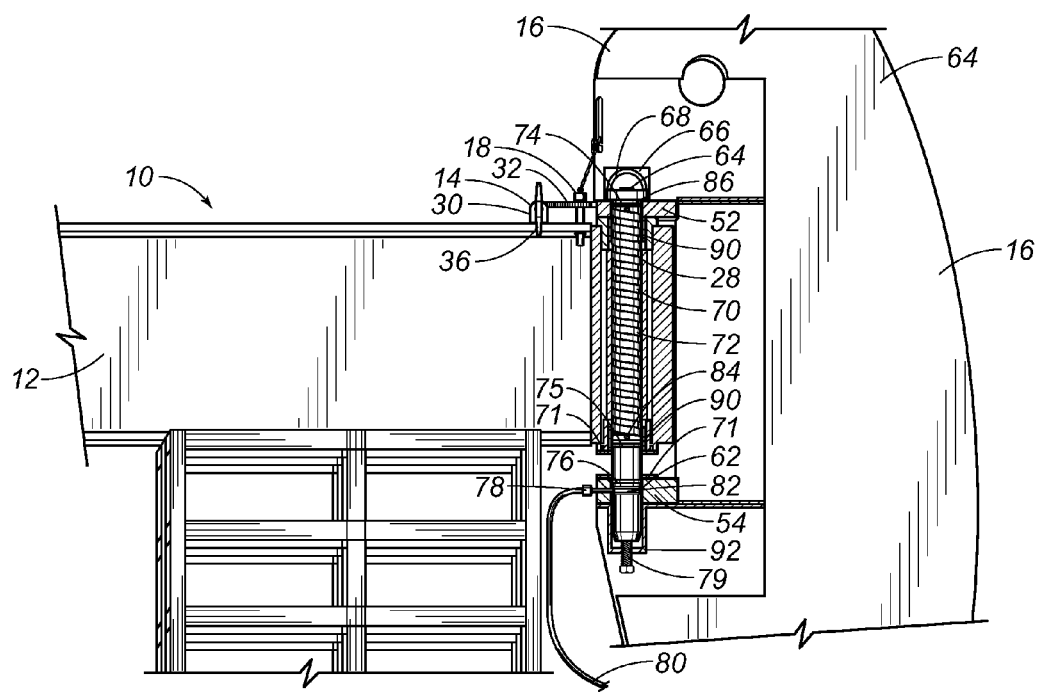
FIG. 12 is a sectional view of the embodiment of the swiveling joint for a pump jack, according to FIG. 5, showing the pivot pin of FIGS. 8 and 9.

The pivot pin 28, or pivot shaft, is the common axis of the horse head member 16, the worm gear 32, and the working end 20 of the working beam 12. The pivot pin 28 extends through the top mounting plate 52, the gear pivot hole 42 of the worm gear 32, the pivot hole 26 of the working beam 12, and the bottom mounting plate 54 of the horse head member 16. FIG. 12 shows the cross-sectional view of one embodiment of the pivot pin 28 through these other structures. FIG. 12 further shows the bottom mounting plate 54 having a bottom mounting hole 62 aligned with the pivot hole 26 and the pivot pin 28, and the top mounting plate 52 having a top mounting hole 60 aligned with the pivot hole 26 and the pivot pin 28.

FIGS. 1, 2 and 12 show the locking pin 18 in embodiments of the swiveling joint system 10. The locking pin 18 is removeably inserted through the second locking hole 46 on worm gear 32 and the first locking hole 24 on the working beam 12. FIGS. 1, 2, and 12 show the active configuration with the locking pin 18 in place. When the flat edge 40 of the worm gear 32 is in an active configuration, the body 64 of the horse head member 16 is aligned with the length of the working beam 12. The pump jack can perform work in this active configuration with all components in a secure and aligned position. In the embodiments of the present invention, the worm threads 34 of the worm 30 engage teeth 44 on a center of the circular edge 38 of the worm gear 32.

The interrelationships of the working beam 12, worm drive 14, horse head member 16, and the locking pin 18 are shown in the active configuration in FIGS. 1, 5, and 12. With the locking pin 18 removed, the swiveling action of the horse head member 16 can occur, as shown in FIGS. 3 and 4. In both active and inactive configurations, the flat edge 40 of the worm gear 32 is flush to the top mounting plate 52 of the horse head member 16, such that the horse head member 16 positioned according to the flat edge 40 of the worm gear 32. The flush abutment of the flat edge 40 coordinates movement of the horse head 16 with movement and position of the teeth 44 on the circular edge 38 relative to the worm 30.

When the locking pin 18 is removed from the second locking hole 46 on the worm gear 32 and the first locking hole 24 on the working beam 12, the body 64 of the horse head member 16 can swivel out of alignment with the length of the working beam 12. The range of rotation is orthogonal to one side of the working beam 12 (FIG. 3) to orthogonal to an opposite side of the working beam 12 (FIG. 4). The swivel action of the horse head member 16 corresponds to the worm threads 34 of the worm 30 engaging teeth 44 along the circular edge 38 of the worm gear 32 in either direction away from the center of the circular edge 38. The rotation of the handle means 36 can correspond to the position of the worm 30 on the teeth 44. The worm drive 14 has self-locking characteristics so that the horse head member 16 can only move according to rotation of the worm 30. The rotation of the worm 30 in either direction controls the swivel movement and position of the horse head member 16. In the active position, there is alignment of the second locking hole 46 and the first locking hole 24, corresponding to center teeth 44 of the worm gear 32 on the worm 30. In the inactive position, the worm 30 is turned so that non-center teeth 44 of the worm gear 32 are engaged by the worm 30. In some embodiments, the inactive position can be locked. The worm drive 14 locks the position or the at least one locking pin can be inserted through second side locking holes on the worm gear 32 and first side locking holes on the working beam 12. The side locking holes can align to allow the locking pin to reinforce the hold of the worm drive 14 in orthogonal positions on either side of the working beam 12.

Another variation on an embodiment is shown in FIG. 4, which includes a variation for more than one locking pin. A plurality of locking pins can be used to hold the horse head member in the active state. For example, two locking pins can be used in the variation shown in FIG. 4. The worm gear 32 shows said second locking hole 46 and another second locking hole 46' for another locking pin. There would be a corresponding first locking hole 24 on the working beam and another first locking hole on the working beam for the alignment of the other locking pin.

In another embodiment of the swiveling joint system 10 of the present invention, there is a lubricating means 78 as shown in FIGS. 5 and 12. The lubrication means 78 includes a hose member 80 connected to a supply of lubrication, and a connection port 82 in the bottom mounting plate 54 of the horse head member 16. The lubricating means 78 can also have an inlet 84 and an outlet 86 on the pivot pin 28. FIG. 12 also shows the inlet 84, the outlet 86 and the connection port 82 on an embodiment of the pivot pin 28. The inlet 84 is on the pivot pin 28 and in fluid communication with the outer surface 72 of the shaft 70. The outlet 86 is on the pivot pin 28 and in fluid communication with the outer surface 72, vent fitting 89 and a storage reservoir 66. The outlet 86 is placed at the upper end of the pivot pin 28 near the vent fitting 89. Lubricant is delivered from the supply, through the hose member 80, through the connection port 82, and to the outer surface 72 through the inlet 84. The lubricant reduces friction and wear on the pivot pin 28 caused by repeated rotation and swiveling of the horse head member 16. Excess lubricant travels through the outer surface 72 to the outlet 86 and can bleed through the vent fitting 89 to the storage reservoir 66 for storage or removal. When the lubricant bleeds through the vent fitting 89, the pivot hole 24 is full.

FIGS. 6-11 show more detailed views of various embodiments of a pivot pin 28 according to the present invention. FIGS. 6 and 7 show views of one embodiment of a pivot pin 128 with a shaft 170 and an outer surface 172. Lubricant delivered to the pivot pin 128 spreads along the outer surface 172 to resist wear and tear from repeated rotation. FIGS. 8 and 9 show views of another embodiment of a pivot pin 28, which is also shown in FIG. 12. The pivot pin 28 can have a sealed vent fitting 89 to the storage reservoir 66, a horse head pin body 68, and shaft 70 with outer surface 72 with a texture. FIGS. 8 and 9 show the texture as spiral grooves 73. The vent fitting 89 and storage reservoir 66 are on the upper end of the pivot pin 28. The shaft 70 and outer surface 72 extend downward through the pivot hole 26 from the horse head pin body 68. FIGS. 10 and 11 show views of still another embodiment of a pivot pin 228. The pivot pin 228 has a shaft 270 with an outer surface 272 with a texture. FIGS. 10 and 11 show the texture as longitudinal slots 273. Additionally, the connection port 282, inlet 284, and outlet 286 are shown for compatibility with a lubricating means 78.

FIG. 12 shows another alternative embodiment of the pivot pin 28, when there is a lubricating means 78. FIG. 12 shows a first seal ring 74 between the top mounting plate 52 of the horse head member 16 and the shaft 70 at an upper end of the pivot pin 28, and a second seal ring 76 between the bottom mounting plate 54 of the horse head member 16 and the shaft 70 at a lower end of the pivot pin 28. Lubricant in the spiral grooves 72 does not leak because of the seal rings 74, 76. Additionally, there is yet another seal ring, a third seal ring 75, between the bottom mounting plate 54 of the horse head member 16 and the shaft 70 at a lower end below the connection port. The seal rings 76 and 75 isolate the connection port 82 from excess leakage from the lubricant pumped from the supply. Embodiments of the pivot pin 28 can also include bearing sleeves 90 to avoid steel-to-steel contact and the resulting rust. A bottom bearing sleeve 92 mounted on a bottom end of the pivot pin 28 also prevents rust and wear due to the swivel action. Additionally, there can be a set screw 79 at the bottom end of the pivot pin 28 to adjust the position of the pivot pin 28 along its axis. The seal covers 71 can be opened for respective seal rings, such as seal rings 75 and 76. The set screw 79 can raise or lower the pivot pin 28 to allow for replacement of the seal rings 75, 76. Graphite packing can also be placed along with the seal rings for additional seal and resistance to wear.

The present invention is a swivel joint for a pump jack. The working beam and the horse head of the pump jack are now rotatable relative to each other. The horse head can swivel from one side of the working beam to the opposite side of the working beam. The aligned and locked position remains the active configuration for the pump jack to function as a pump jack. Either of the swiveled positions of the horse head or positions ranging between the maximum amount of swiveling correspond to an inactive configuration. The swiveling improves access to the parts of the pump jack, including horse head, the working beam, the bridle, and others. Swiveling and swiveling to either side also provide flexibility of service rig location. Additionally, the horse head can swivel to either side of the working beam. More space can be made for different access to other components of the pump jack and oil or gas well. The side locking pins and corresponding sidle locking holes also stably maintain the horse head member in position, when the horse head member is out of alignment with the working beam. In the inactive configuration, the side locking pins can hold the horse head member is a safe position. These parts or components of the pump jack can be more easily maintained, serviced, and repaired, and the oil or gas well can be more easily maintained, serviced, and repaired. The swiveling also improves safety by keeping the horse head attached to the working beam. There is less danger for lifting heavy equipment, such as the horse head, which remains supported on the pump jack. Workers have less risk of injury from a supported and controlled swivel action.

Embodiments of the present invention also provide a worm drive coordinated with a position of the horse head. The worm drive is positioned on a top side of the working beam, which can be easily viewed and accessed for controlling and monitoring the swivel action. The present invention also provides for maintenance to insure the continued ability to swivel the horse head in the form of a lubrication means. The lubrication means resists wear and tear on the pivot pin between the working beam and the horse head, which extends the working life of the pump jack. Furthermore, the pivot pin can include a storage reservoir or sealed lid to contain excess lubricant from the lubrication means. The sealed lid can be removed for easy cleaning of the excess lubricant from the pump jack.

The foregoing disclosure and description of the invention is illustrative and explanatory thereof. Various changes in the details of the illustrated structures, construction and method can be made without departing from the true spirit of the invention.

I claim:

1. A swiveling joint system for a pump jack, comprising:
 a working beam having a working end and a balancing end, said working end having a first locking hole, a pivot hole and a pivot pin;

a worm drive positioned on said working end, said worm drive being comprised of a worm and a worm gear, wherein said worm is comprised of worm threads oriented along a length of said working beam, and a handle means attached to an end of said worm, said handle means rotating said worm threads in both directions, wherein said worm gear has a generally semicircular shape with a circular edge and a flat edge, and wherein said worm gear is comprised of a gear pivot hole at a center of said worm gear, a plurality of teeth on said circular edge, and a second locking hole corresponding in location to said first locking hole on said working beam, said teeth engaging said worm threads of said worm gear;

a horse head member with a means for connecting to said working beam, said means for connecting comprising:
  a mounting notch formed within a body of said horse head member;
  a top mounting plate on a top shoulder of said mounting notch; and
  a bottom mounting plate on a bottom shoulder of said mounting notch,
wherein said mounting notch corresponds in size to said working end of said working beam, said working beam fitting within said mounting notch and being rotatable through said mounting notch,
wherein said pivot pin extends through said top mounting plate, said gear pivot hole of said worm gear, said pivot hole of said working beam, and said bottom mounting plate of said horse head member, and
wherein said flat edge of said worm gear is in flush engagement to said top mounting plate of said horse head member, said horse head member being positioned according to said flat edge of said worm gear; and
  at least one locking pin removeably inserted through said second locking hole on said worm gear and said first locking hole on said working beam, when said flat edge of said worm gear is in an active position, said body of said horse head member being aligned with said length of said working beam, said worm threads of said worm engaging teeth on a center of said circular edge of said worm gear.

2. The swiveling joint system, according to claim 1, said first locking hole being located closer to said balancing end than said pivot hole, said second locking hole being radially spaced from said gear pivot hole towards said circular edge.

3. The swiveling joint system, according to claim 1, further comprising another locking pin, said worm gear having another second locking hole, said working beam having another first locking hole, wherein said another locking pin is inserted through said another second locking hole and said another first locking hole, when said flat edge of said worm gear is in an active position, alignment of said another second locking hole and said another first locking hole corresponding to alignment of said second locking hole and said first locking hole.

4. The swiveling joint system, according to claim 1, wherein said worm is mounted on a top side of said working beam.

5. The swiveling joint system, according to claim 1, wherein said worm extends across a width of the working beam.

6. The swiveling joint system, according to claim 1, said worm being oriented orthogonal to a length of said working beam.

7. The swiveling joint system, according to claim 1, said gear pivot hole of said worm gear being aligned with said pivot hole on said working end, said pivot pin extending through said gear pivot hole of said worm gear and said pivot hole for fixed alignment and attachment of said worm gear on said working end.

8. The swiveling joint system, according to claim 7, wherein said flat edge faces away from said worm.

9. The swiveling joint system, according to claim 1, said bottom mounting plate having a bottom mounting hole aligned with said pivot hole and said pivot pin, said top mounting plate having a top mounting hole aligned with said pivot hole and said pivot pin, wherein said pivot pin extends through said top mounting hole of said top mounting plate of said horse head member, said gear pivot hole of said worm gear, said pivot hole of said working beam, and said bottom mounting hole of said bottom mounting plate of said horse head member.

10. The swiveling joint system, according to claim 1, wherein said body of said horse head member swivels out of alignment with said length of said working beam, when said locking pin is removed from said second locking hole on said worm gear and said first locking hole on said working beam.

11. The swiveling joint system, according to claim 10, wherein swivel action of said horse head member corresponds to said worm threads of said worm engaging teeth along said circular edge of said worm gear in either direction away from said center of said circular edge, said body of said horse head member having a range of rotation from orthogonal to one side of said working beam to an opposite side of said working beam.

12. The swiveling joint system, according to claim 10, wherein said working beam is further comprised of first side locking holes, wherein said worm gear is further comprised of second side locking holes, and wherein at least one first side locking hole is aligned with at least one second side locking hole, and wherein said at least one locking pin is removeably inserted through at least one of said second side locking holes on said worm gear and at least one of said first side locking holes on said working beam, when said flat edge of said worm gear is in an inactive position, said body of said horse head member being orthogonal to said length of said working beam on either side of said working beam, said worm threads of said worm engaging teeth on either end of said circular edge of said worm gear.

13. The swiveling joint system, according to claim 1, further comprising:
  a lubricating means in fluid connection with said pivot pin, said lubricating means comprising;
    a hose member connected to a supply of lubrication;
    a connection port in said bottom mounting plate of said horse head member;
    a inlet on said pivot pin, being in fluid communication with an outer surface of said pivot pin; and
    an outlet on said pivot pin, being placed at said upper end of said pivot pin in fluid communication with said outer surface of said pivot pin and a storage reservoir.

14. The swiveling joint system, according to claim 13, wherein said pivot pin comprises:
  a vent fitting on an upper end of said pivot pin;
  a horse head pin body supporting said vent fitting; and
  a shaft with said outer surface extending downward through said pivot hole.

15. The swiveling joint system, according to claim 14, wherein said outer surface of said pivot pin is comprised of one of group consisting of: spiral grooves and longitudinal slots along a length of said shaft.

16. The swiveling joint system, according to claim 13, further comprising:

a first seal ring between said top mounting plate of said horse head member and said shaft at an upper end of said pivot pin;

a second seal ring between said bottom mounting plate of said horse head member and said shaft at a lower end of said pivot pin and above said connection port; and a third seal ring between said bottom mounting plate of said horse head member and said shaft at a lower end and below said connection port.

17. A swiveling joint system for a pump jack, comprising:

a working beam having a working end and a balancing end, said working end having a first locking hole, a pivot hole and a pivot pin, said pivot pin being insertable through said pivot hole;

a worm drive positioned on a top side of said working end, said worm drive being comprised of a worm and a worm gear, wherein said worm is comprised of worm threads, wherein said worm gear has a generally semicircular shape with a circular edge and a flat edge, and wherein said worm gear is comprised of a gear pivot hole at a center of said worm gear, a plurality of teeth on said circular edge, and a second locking hole corresponding in location to said first locking hole on said working beam, said teeth engaging said worm threads of said worm gear;

a horse head member with a means for connecting to said working beam, said means for connecting comprising:

a mounting notch formed within a body of said horse head member;

a top mounting plate on a top shoulder of said mounting notch; and a bottom mounting plate on a bottom shoulder of said mounting notch, wherein said mounting notch corresponds in size to said working end of said working beam, said working beam fitting within said mounting notch and being rotatable through said mounting notch, and wherein said pivot pin extends through said top mounting plate, said gear pivot hole of said worm gear, said pivot hole of said working beam, and said bottom mounting plate of said horse head member;

at least one locking pin removeably inserted through said second locking hole on said worm gear and said first locking hole on said working beam, when said flat edge of said worm gear is in an active position, said body of said horse head member being aligned with said length of said working beam, said worm threads of said worm engaging teeth on a center of said circular edge of said worm gear; and a lubricating means in fluid connection with said pivot pin, said lubricating means comprising;

a hose member connected to a supply of lubrication;

a connection port in said bottom mounting plate of said horse head member;

a inlet on said pivot pin, being in fluid communication with an outer surface of said pivot pin; and an outlet on said pivot pin, being placed at said upper end of said pivot pin in fluid communication a storage reservoir.

18. The swiveling joint system, according to claim 17, wherein said pivot pin comprises:

a vent fitting on an upper end of said pivot pin, said vent fitting being attachable to a storage reservoir;

a horse head body pin supporting said vent fitting;

a shaft with said outer surface extending downward through said pivot hole; and a plurality of seal rings, wherein at least one seal ring is between said top mounting plate of said horse head member and said shaft at an upper end of said pivot pin, and wherein at least another seal ring is between said bottom mounting plate of said horse head member and said shaft at a lower end of said pivot pin.

19. The swiveling joint system, according to claim 18, wherein said outer surface is comprised of one of a group consisting of spiral grooves and longitudinal slots.

20. The swiveling joint system, according to claim 17, wherein said flat edge of said worm gear is in flush engagement to said top mounting plate of said horse head member, said horse head member being positioned according to said flat edge of said worm gear, and wherein swivel action of said horse head member corresponds to said worm threads of said worm engaging teeth along said circular edge of said worm gear in either direction away from said center of said circular edge, said body of said horse head member having a range of rotation from orthogonal to one side of said working beam to an opposite side of said working beam.

* * * * *